United States Patent Office 2,993,898
Patented July 25, 1961

2,993,898
PROCESS FOR THE PREPARATION OF 8-CHLOROALLOXAZINE

Harold G. Petering, Kalamazoo, Mich., assignor to The Upjohn Company, Kalamazoo, Mich., a corporation of Delaware
No Drawing. Filed July 9, 1959, Ser. No. 825,897
3 Claims. (Cl. 260—251.5)

This invention relates to a process for the preparation of 8-chloroalloxazine substantially free from impurities.

We have found that 8-chloroalloxazine possesses marked diuretic activity whereas certain impurities, to be described hereinafter, which are produced as byproducts in the synthesis thereof, possess much less activity. 8-chloroalloxazine has the following structure:

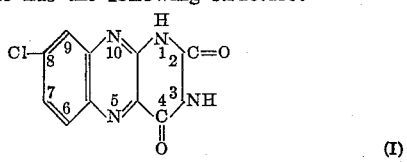

[The system of numbering of the positions in the alloxazine molecule employed throughout this specification is that adopted by Chemical Abstracts.]

Accordingly it is desirable that any method employed for the synthesis of 8-chloroalloxazine for therapeutic purposes should be capable of yielding the latter compound substantially free from less active impurities. It is an object of the present invention to provide a process for the synthesis of 8-chloroalloxazine which meets these requirements. Other objects of the invention will be apparent to those skilled in the art.

The synthesis of 8-chloralloxazine in substantially pure form has not been described previously. Wolf et al., J. Am. Chem. Soc. 70, 2572–4 (1948) have reported the preparation of a chloroalloxazine by the reaction of 4-chloro-1,2-phenylenediamine with alloxan in 0.36 N aqueous hydrochloric acid solution. It will be seen from the following equations that the reaction of alloxan and the diamine is theoretically capable of giving rise to either 7- or 8-chloroalloxazine.

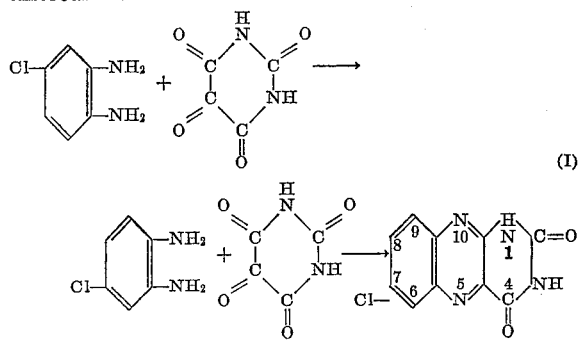

The above authors did not identify precisely the product which they obtained but indicated only that it was either the 7- or 8-isomer; no physical characteristics were given for the product except that it did not melt when heated at 360° [centigrade], and no analysis was given. We have repeated the procedure described by the above authors and have shown that the product obtained is a mixture of 8-chloroalloxazine and a number of impurities the chief of which is 6-chloro-1,2-dihydro-2-keto-3-carboxyquinoxaline ureide having the formula:

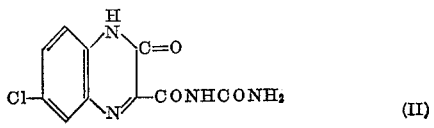

We have been unable to detect the presence of 7-chloroalloxazine in the reaction product obtained using the above procedure or procedures to be described hereinafter.

We have now found that, by employing certain critical conditions in the reaction of 4-chloro-1,2-phenylenediamine with alloxan, it is possible to obtain, as the main product, 8-chloroalloxazine substantially free from the ureide (II) and other impurities.

The term "8-chloroalloxazine substantially free from impurities" as used in this specification means 8-chloroalloxazine which, when subjected to paper chromatographic analysis, shows no evidence of the presence of the ureide (II) and other impurities. 8-chloroalloxazine can be separated readily from the ureide (II) using circular paper chromatography with a solvent system composed of 6 parts by volume of n-butanol, 4 parts by volume of pyridine and 3 parts by volume of water. In this solvent system the ureide (II) and 8-chloroalloxazine have $R_f$ values of 0.80 and 0.88 respectively. Another suitable solvent consists of 83 parts by volume of n-butanol, 2 parts by volume of piperidine and 15 parts by volume of water. In this solvent system the ureide (II) and 8-chloroalloxazine have $R_f$ values of 0.70 and 0.60 respectively. Both the ureide and the alloxazine are detected easily on the chromatogram since they fluoresce when illuminated with ultraviolet light. Using such chromatographic conditions it is possible to detect amounts of the ureide (II) as low as the order of 1 percent in admixture with 8-chloroalloxazine.

We have now found that when the condensation of 4-chloro-1,2-phenylenediamine and alloxan is carried out in the presence of aqueous mineral acid the concentration of the latter has a profound effect upon the composition of the resulting product. Thus when the condensation is carried out in 0.36 N aqueous hydrochloric acid, i.e. as described by Wolf et al., supra, the resulting product consists for the most part of the desired 8-chloroalloxazine and the ureide (II) in the approximate proportions of 1 part by weight of the former to 2 parts by weight of the latter. When the condensation is carried out in the presence of increasing concnetrations of aqueous hydrochloric acid it is found that the proportion of the undesired ureide (II) diminishes and the proportion of the desired 8-chloroalloxazine increases correspondingly. When the concentration of aqueous hydrochloric acid reaches 0.5 N the proportion of ureide (II) present in the reaction product is so small that it is difficult to detect chromatographically. When the concentration of aqueous hydrochloric acid is above 0.5 N the product of the condensation is 8-chloroalloxazine substantially free from impurities.

It is also found that similar results are obtained when the reaction is carried out in the presence of aqueous solutions of other non-oxidizing strong mineral acids, illustratively, sulfuric and hydrobromic acids.

Accordingly, the process of the present invention comprises reacting 4-chloro-o-phenylenediamine and alloxan in the presence of a non-oxidizing strong mineral acid of a concentration of at least 0.5 N to obtain 8-chloroalloxazine substantially free from impurities.

The upper limit of concentration of the aqueous mineral acid employed in the process of the invention is dictated, in the case of acids such as hydrochloric and hydrobromic, largely by economic and practical considerations. In the case of sulfuric acid, however, the concentration of acid employed in the process of the invention should not be greater than 5 N, otherwise some degradation of the 8-chloroalloxazine may occur. Advantageously the concentration of any of the strong mineral acids employed in the process of the invention should not be greater than 5 N and preferably the concentration of the acid is of the order of 1 N.

The relative proportions of alloxan and 4-chloro-1,2-phenylenediamine which can be employed in the process of the invention can be varied over a wide range. However, it is preferable that the proportions of the reactants be substantially equimolar.

The process of the invention can be carried out over a wide range of temperatures without influencing significantly the yield and purity of the desired product. Thus the reaction can be effected at temperatures within the range of about 15° C. to about 100° C., the speed of the reaction increasing as the temperature is raised. The reaction is generally complete within a period of 10 minutes at a reaction temperature of 80° C. to 90° C.

The process of the invention can be carried out in a convenient manner, observing the above requirements as to proportions of reactants, concentration of acid, etc., by mixing the alloxan (usually in the form of its monohydrate), 4-chloro-1,2-phenylenediamine, and the aqueous strong mineral acid in any order and maintaining the mixture at the desired temperature, preferably with constant stirring, for the required period of time. The 8-chloroalloxazine separates from the reaction mixture as a solid and can be recovered readily by filtration or by centrifugation. The product so isolated is generally in a high state of purity and requires no further treatment. If desired, however, the product can be recrystallized from a suitable solvent such as methyl Cellosolve.

The following example is illustrative of the process of the present invention but is not to be construed as limiting.

*Example 1.—Preparation of 8-chloroalloxazine*

A series of preparations was carried out using aqueous hydrochloric acid, ranging in concentration from 0.36 N to 5 N, as reaction medium. In each experiment a mixture of 1 g. (0.0071 mole) of 4-chloro-1,2-phenylenediamine and 1 g. (0.0063 mole) of alloxan monohydrate in 20 ml. of aqueous hydrochloric acid of given concentration was stirred and maintained at 80 to 90° C. for 10 minutes. The reaction mixture was cooled and the insoluble material was recovered by filtration, washed with water and dried. The 8-chloroalloxazine so obtained was subjected to circular paper chromatography using a solvent system comprising 6 parts by volume of n-butanol, 4 parts by volume of pyridine and 3 parts by volume of water. The results given in the following table show the concentration of acid employed in each experiment, the yield and melting point of the 8-chloroalloxazine and the amount of ureide (II) present in the latter compound, as determined by chromatography.

TABLE

| Acid Concn. | Yield, g. | M.P., ° C. | Amount of ureide (II) |
|---|---|---|---|
| 0.36 | 1.38 | 250–253 | Approx. 66 percent. |
| 0.50 | 1.29 | 320–330 | Trace. |
| 0.75 | [1] 0.91 | 320–330 | Nil. |
| 1.0 | 1.22 | 320–330 | Nil. |
| 1.25 | 1.28 | 320–330 | Nil. |
| 2.5 | 1.26 | 325–330 | Nil. |
| 5.0 | 1.14 | 320–330 | Nil. |

[1] Mechanical loss.

I claim:

1. A process for the preparation of 8-chloroalloxazine substantially free from impurities which comprises reacting 4-chloro-o-phenylenediamine and alloxan in the presence of a non-oxidizing strong mineral acid of a concentration within the range of 0.5 N to 5 N.

2. The process of claim 1 in which the mineral acid is hydrochloric acid.

3. A process for the preparation of 8-chloroalloxazine substantially free from impurities which comprises reacting approximately equimolar proportions of 4-chloro-o-phenylenediamine and alloxan in the presence of aqueous hydrochloric acid of a concentration within the range of 0.5 N to 5 N at a temperature of about 80° C. to about 90° C.

References Cited in the file of this patent

Wolf et al.: J. Amer. Chem. Soc., vol. 70 (1948), pp. 2572–4.